April 25, 1944.　　　G. C. FORD　　　2,347,405
DOLL
Filed Sept. 24, 1942
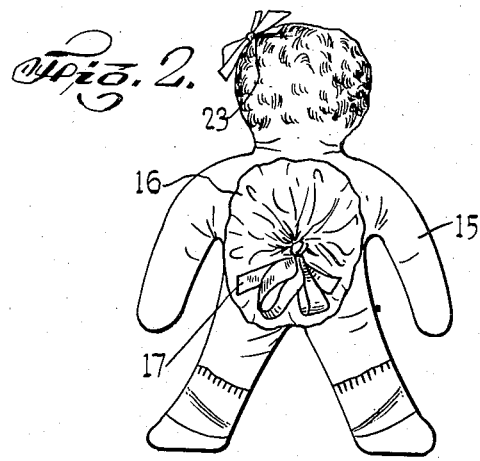
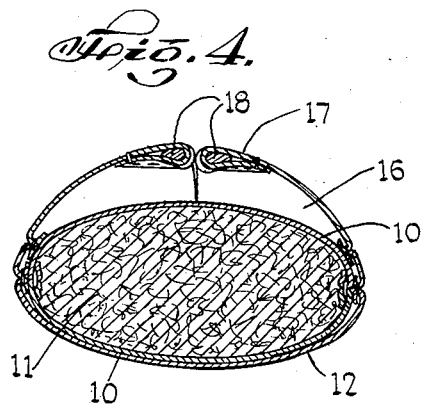
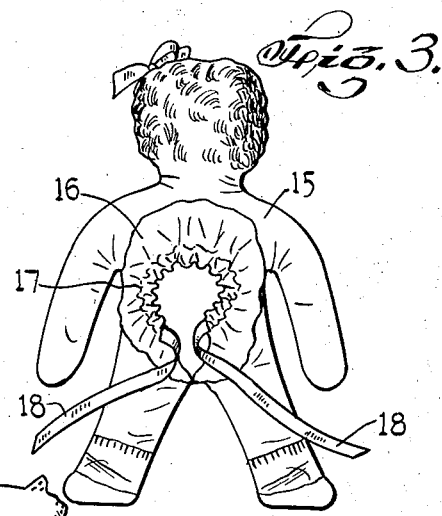
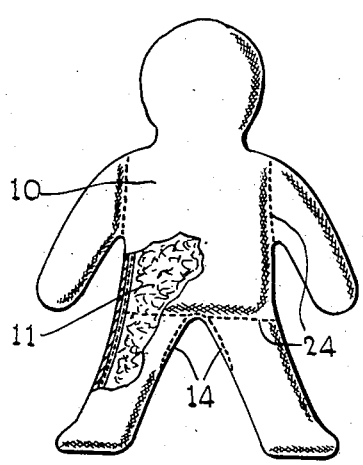
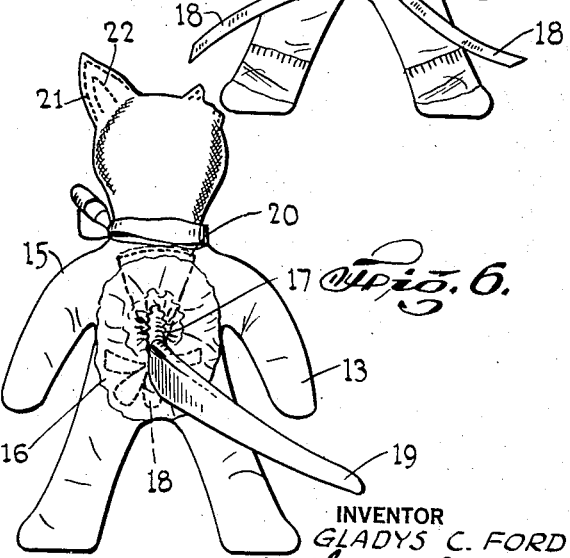
INVENTOR
GLADYS C. FORD
BY
ATTORNEY

Patented Apr. 25, 1944

UNITED STATES PATENT OFFICE 2,347,405

DOLL

Gladys C. Ford, New York, N. Y.

Application September 24, 1942, Serial No. 459,481

2 Claims. (Cl. 46—151)

This invention relates to toys.

More particularly, my present invention is directed to toys of the nature of dolls, animals and the like, comprising an inner member of preformed, deformable complete three-dimensional configuration and one or more outer members arranged for replaceable envelopment about the stated inner member, the outer members respectively bearing markings appropriate to the figure of a doll, animal and the like.

A particular feature resides in the provision of a part integral or connected with the material of the outer member which is provided with material-drawing means such as a hem through which is passed a draw string or equivalent, whereby upon enveloping the outer member about the inner member proper tension is applied to all portions of the outer member to effect a smoothing-out of the material of the outer member to thereby present a faithful reproduction of a doll, animal or the like.

A further feature of embodiments of my invention is the provision of an element in similitude of a tail appropriate for certain toys, such as of animals and advantageously associated with said material-drawing means.

Accordingly, an object of the invention resides in a toy of the nature of a doll, animal or the like, comprising an outer member which may be washed, sterilized, or the like, in combination with a deformable three-dimensional inner form member.

An object of the invention resides in the employment of a deformable inner common three-dimensional form member with which may be associated a plurality of selective outer or envelope members respectively representing dolls, animals, or the like, i. e., outer members having configuration different from one another and different from the deformable inner member.

Further features and objects of the invention will be more fully understood from the following detail description, and the accompanying drawing, in which Fig. 1 is a front elevation, partly broken away, of a preferred embodiment of my invention;

Fig. 2 is a real elevation of the embodiment shown in Fig. 1;

Fig. 3 is a rear elevation of the outer or envelope member illustrated in Figs. 1 and 2, the closure thereof being partially open;

Fig. 4 is a horizontal section taken on the line 4—4 of Fig. 1;

Fig. 5 is an elevation, either front or rear, of the inner three-dimensional form member, an outer portion of which is broken away to reveal otherwise hidden parts;

Fig. 6 is a rear elevation of another preferred embodiment of my invention.

Referring to the drawing: "rag" dolls and toys have always been popular with children because they are not only attractive in their doll-like attributes and/or in their resemblance to animals, but also because they eliminate harsh, stiff materials applied over hard bases forming the foundation of a conventional doll or toy. "Rag" dolls or toys are frequently stuffed to impart a soft, resilient "squeezable" quality, but the outside cover of which is permanently fixed, as by sewing, and is non-detachable from the inner "stuffing". Such permanent cover is usually decorated to resemble a doll or an animal, but possesses many disadvantages, particularly the difficulty of cleaning, which for hygienic reasons shorten the life of a doll or toy.

It will be seen from the accompanying drawing that the illustrated embodiments of my invention possess many highly desirable advantages hereinafter set forth. Firstly, I provide a basic form or inner member 10, well known to the art, which may be stuffed or padded with material 11 to acquire any desired three-dimensional configuration and which possesses soft and resilient "squeezable" qualities at all times. Protection is afforded by the outer cover or member 12 simulating a doll, as shown in Figs. 1 through 5, or an animal, such as a rabbit 13 as indicated in Fig. 6, which maintains the basic form 10 in unsoiled status.

Secondly, irrespective of what characterization the outer cover or member may portray, it will envelope with equal facility the inner or basic member 10. Thus it will be seen that not only may the outer cover, preferably fabricated of washable material, be readily removed for laundering and/or sterilizing purposes, but it is feasible to provide several differently configurated outer coverings or members 12, 13, and the like, for association with a single or common inner or basic member 10. Such material, as set out in my U. S. Patent No. 1,690,778, dated November 6, 1928, entitled "Doll," of affording various detachable decorative coverings for a basic member, is improved by my instant invention.

The basic or deformable inner form member of my instant invention comprises separate arms and legs giving the doll and/or animal a more life-like appearance and enhanced appeal. The covering of the basic inner member 10, after being cut to pattern in two pieces, i. e., front and rear, may be simply stitched together and turned, leaving an appropriate space through which the member 10 may be padded with stuffing 11. Upon completion of the padding operation, said space may be closed, as by stitching 14.

The decorative outer cover, or envelope members 12, 13 and the like are preferably cut in three or more pieces, namely the front; the back 15, which is similar to the front but has a substantially circular opening between the head, arms and legs; and a closure strip, preferably of the same material, stitched or otherwise joined to the margin which defines the said circular opening in the back 15, such closure strip being preferably of split-ring formation and provided with a hem 17 about its free edge, through which a ribbon 18 or cord may be threaded to serve as a draw-string.

The wide opening which such closure strip or ring 16 of my invention provides, facilitates the smooth insertion of the basic or inner member 10 within the selected outer member or cover 12, or 13 or the like. Upon the complete insertion of the basic member 10, the ribbon or cord 18 is then drawn and tied to effect a gathering and substantial closing of the closure strip or ring 16, whereupon the ribbon or cord 18 may be conveniently tucked within the closed ring formation 16, see Fig. 6, where it is not only out of sight but free from accidental untying.

Animal "dolls" may be enhanced by a tail member such as is indicated at 19 which may be effectively produced by attaching the open end of a suitably finished, triangularly or circularly shaped strip of material to the rear 15 of the outer covering 13 as by stitching 20 or the like. This tail member 19 may be joined to the rear outer covering 15 simultaneously with the attachment of closure strip 16 by any similar means known to the art. The finished tail member 19 protrudes in a realistic manner from the reduced central opening effected when the closure strip or ring 16 is in closed position, see Figs. 2 and 4.

It may be preferred to provide outside or additional stitching or the like, such as at 21 which lends greater body to certain portions of the outer covering 13 whereat increased stiffness is desired. Preferred portions of the outer coverings may be advantageously reinforced by additional stitching or the like indicated at 22, see Fig. 6.

The two pieces of fabric forming the outer cover or member of the doll 12 may be cut and sewn to form a loop 23, as shown in Fig. 1, through which a hair ribbon or the like may be secured.

This invention also affords designing the outer members simulating certain animals such as rabbits, squirrels and the like, in sitting and/or hunched or other non-erect positions. For use with such outer members, not shown, it may be advantageous to stitch the basic or deformable inner member 10 as indicated at 24, see Fig. 5, in order that it may more readily retain any desired sitting and/or hunched or like positions when used with such animal members. It will nevertheless be readily understood that the basic inner member 10 so stitched is equally usable with outer members simulating standing positions of dolls, animals and the like, as illustrated in the drawing.

From the foregoing it will be apparent that the collar-like member provided with a draw string for securing the selected outer member or cover about the inner deformable member functions to effect a uniform tension in and through the material of the outer member in substantially all directions, thus affording substantial smoothness of the material of the outer member throughout, and also conforms the inner deformable member to the configuration of the outer member, as in the cited instances of either erect position or sitting or hunched or other non-erect position.

Whereas I have described my invention by reference to specific forms thereof, it will be understood that many changes and modifications may be made provided they do not depart from the scope of the claims.

I claim:

1. A toy figure, comprising a flexible sheet material formed as an envelope simulating the shape of a living thing, said envelope having a substantially circular opening provided in a wall thereof for admitting into the interior of said envelope a flexible form as stuffing; a closure strip secured about the margin of said opening and affording a passage leading to the interior of said envelope; a hem formed about the free edge of said closure strip; and a draw string passed through and extending from said hem, whereby the said closure strip can be drawn substantially concentrically together to tightly close said opening.

2. A toy figure, comprising flexible sheet material formed as an envelope simulating the shape of a living thing, said envelope having a substantially circular opening provided in a wall thereof for admitting into the interior of said envelope a flexible form as stuffing; a closure strip secured about the margin of said opening and having ends which lie mutually adjacent, the whole providing a split-ring formation affording passage to the interior of said envelope; a hem formed about the free edge of said closure strip; and a draw string passed through and extending from said hem, whereby the said closure strip can be drawn substantially concentrically together to tightly close said opening.

GLADYS C. FORD.